Feb. 27, 1962   W. G. CRYDERMAN ET AL   3,023,124
METHOD OF MAKING TEXTURED LEATHER-LIKE
ARTICLE AND PRODUCT THEREOF
Original Filed Nov. 28, 1958

INVENTORS
WILFRED G. CRYDERMAN & ARTHUR R. MARSHALL
BY
Barnes, Kisselle, Raisch & Choate
ATTORNEYS

United States Patent Office 3,023,124
Patented Feb. 27, 1962

3,023,124
METHOD OF MAKING TEXTURED LEATHER-LIKE ARTICLE AND PRODUCT THEREOF
Wilfred G. Cryderman and Arthur R. Marshall, Birmingham, Mich., assignors to Kaybar, Inc., Birmingham, Mich., a corporation of Michigan
Continuation of application Ser. No. 819,143, Nov. 28, 1958. This application Mar. 6, 1959, Ser. No. 797,728
11 Claims. (Cl. 117—45)

This application is a continuation of our application filed November 28, 1958, having the same title, Serial Number 819,143 now abandoned.

This invention relates generally to the art of making articles wherein a base of generally form-retaining material such as metal is provided with a coating of a finishing material having leather-like character in appearance and to the sense of touch.

Heretofore, the stock from which such articles have been made has consisted of flat sheet metal with a layer of plastic adhered thereto. According to one process, the plastic sheet has been subjected to mechanical embossing before it is laminated to the sheet metal and according to another process, the plastic sheet is first adhered to the sheet metal and then subjected to mechanical embossing. According to another method, the texturing of the plastic has been accomplished chemically before the plastic is cured. In all of these methods, the resulting produt is flat sheet material comprising a layer of metal with a layer of plastic thereon. The flat laminated sheet is fashioned into articles of manufacture.

All of these prior methods are objectionable in that they are adapted only for large scale production of flat sheet stock. To fashion the stock into shaped articles, the stock must usually be severed to provide blanks which are then subjected to die forming. The severing results in raw metal edges which are frequently undesirable and the scrap formed as a result of forming the blanks can not be reclaimed or reused in the manner of ordinary scrap steel because of its plastic coating. The die forming of the article, at best, results in shiny spots where the plastic has been polished by the dies. The die forming also tends to obliterate the texturing. Moreover, any particles picked up by the dies tend to mar or tear the plastic coating and the dies themselves are unusally expensive since unusual precision is required to keep marring and scratching of the plastic to a minimum.

These prior methods also give rise to stocking and storing problems on the part of the fabricator since large quantities of the sheet material must be ordered at one time in order to obtain the stock at a reasonable cost and where stock of different colors, for example, is required by the fabricator, the volume and cost of his inventory is very high.

The materials made by mechanically embossing the plastic are also objectionable because the plastic sheet must be thick enough at its thinnest portions to withstand forseeable usage and the thicker portions required to provide the textured effect are necessarily thicker than required for many actual usages, thus adding to the cost of the manufactured article. The chemical texturing method is limited in that little control can be had over the pattern of the texture, the pattern in most cases comprising merely random irregularities.

An object of the present invention is to provide a method of producing articles of the type described which is improved from the standpoint of simplicity and economy and which provides an improved product.

The invention is carried out generally by embossing a surface of the underlying base material and applying the coating material in spray form over the embossed surface in such a way that the coating material conforms to the embossing and the exposed surface of the coating generally reproduces the underlying embossing to provide the article with the desired textured leather-like finish. In the drawings.

Figure 1:
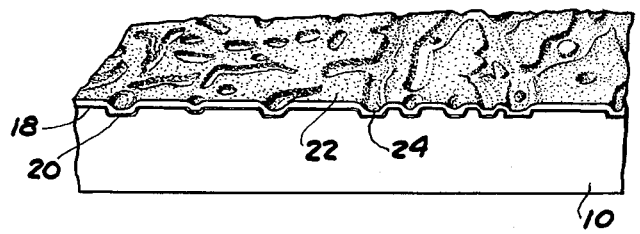
FIG. 1 is a diagrammatic fragmentary perspective illustration of a sheet of material coated in accordance with the present invention.
Figure 2:
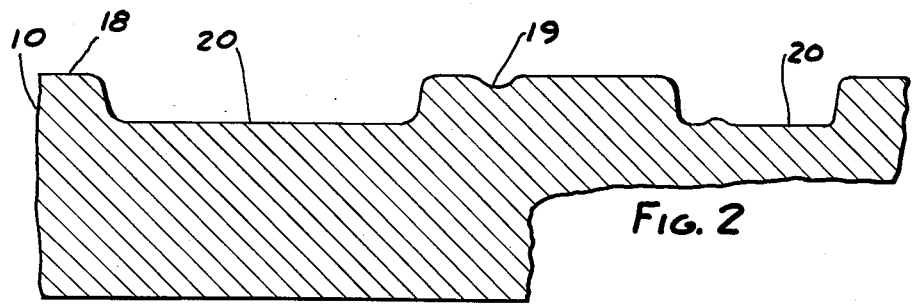
FIG. 2 is an enlarged diagrammatic fragmentary sectional view of the bare stock to which the coating is to be applied.

Shown in the drawings is a sheet of metal 10 having relatively projecting portions 18 and indented portions 19 and 20 arranged to provide a textured appearance such as the leather grain texture represented in FIG. 1. The texturing is provided by conventional manufacturing methods such as by subjecting flat sheet metal stock to the action of embossing rolls bearing the desired textured pattern.

Generally speaking, to apply the plastic coat to the sheet metal the sheet metal is first degreased or otherwise treated for the reception of the primer. The primer 21 is then applied over the textured surface by a conventional method such as spraying to a depth of approximately ¼ to ½ mils.

Figure 3:
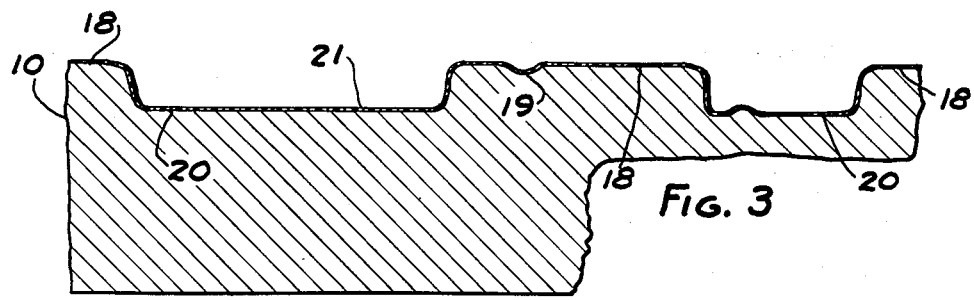
FIG. 3 is similar to FIG. 2 but illustrating a primer coating applied to the stock.

The primer is of a material which will bond to the underlying textured surface and to which the film forming plastic coating will bond. It will be noted from examination of FIG. 3 that the primer causes little or no significant obscuring or alteration of the texture in the metal plate. After the primer has been cured, the film forming plastic material is applied over the primer in the form of a spray under conditions controlled so that the exposed or obverse face of the coating reproduces generally the underlying texture of plate 10. The plastic coating is applied to a depth in the range from about 3 mils to about 20 mils.

In general, the primer is of the type containing phenolic or epoxy resins or combinations thereof in an organic air drying or bake drying solvent. An example of suitable primer is 219 PX produced by Metal and Thermit Corp., Rahway, New Jersey.

In general, the fluid which is to be sprayed over the primed metal surface to provide the plastic coating, contains a film-forming resin dispersed and substantially undissolved in a liquid medium which contains dissolved resins for binding the dispersed resins to prevent mudcracking upon drying and for providing the cured coating with resistance to distortion upon ambient temperature changes. The liquid medium contains plasticisers and stabilizers and may contain suitable pigments.

The dispersion type resin may be a polyvinyl chloride or other thermoplastic resin, examples of which are commercially available as: VINV–1 and VINV–2 produced by Bakelite division of Union Carbide and Carbon Corporation; Geon 121 produced by Goodrich Chemical; and VR 10 produced by Naugatuck Chemical Division of U.S. Rubber Company.

Examples of suitable dissolved resins are: acrylic polymers such as Acryloid B–72 (Rohm & Haas) or Dupont Lucite No. 44; butylated urea formaldehyde resins such as F 240 N (Rohm & Haas) and butylated melamine formaldehyde resins such as MX 61 (Rohm & Haas).

Examples of suitable plasticisers are: diisooctyl adipate, polymeric plasticisers such as G–25 (Rohm & Haas) and dioctyl phthalate (Union Carbide and Carbon DOP). A tin, zinc, barium, cadmium, or epoxy stabilizer or other suitable stabilizer may be employed.

Numerous solvents may be used such as aromatic or aliphatic hydrocarbons or chlorinated hydrocarbons or a blend thereof. Examples of suitable aliphatic hydrocarbons are toluol, xylene, VM and F naphtha, and methyl isobutyl ketone. Examples of suitable chlorinate hydrocarbons: trichlorethylene, methylene chloride, and methyl chloroform. Also a member of the paraffin family such as 2-nitro-propane may be employed.

The pigment may comprise any material suitable for inclusion in a resinous film, examples of which are titanium oxide or other metal oxides, lamp black and filler materials such as calcium carbonate.

The specific ingredients employed will depend upon the physical properties desired of the material to be sprayed onto the work which in turn will vary with such factors as the type of spray equipment, drying equipment and in general the conditions under which the spray is applied to the work. The chosen ingredients may be compounded by conventional industrial methods and equipment and the coating material formed thereby may be applied to the work by means of conventional industrial mechanical or electrostatic spray equipment.

An example of a coating fluid to be sprayed onto the primed work in spray form not utilizing electrostatic equipment is as follows:

1400 parts polyvinyl chloride dispersion type resin (Goodrich Chemical, Geon 121)
2000 parts toluol
450 parts urea formaldehyde resin (Rohm & Haas F 204 N)
600 parts dioctal phthalate plasticiser (Union Carbide and Carbon DOP)
120 parts tin stabilizer Where electrostatic type spraying equipment is employed a somewhat larger portion of solvent is preferably used and the above example may be modified to include about 3000 parts toluol. To the above compositions, suitable quantities of pigments may be added and the formula may be adjusted in a conventional manner according to the amount of pigment material added.

It is important that the coating material be sprayed onto the work under such conditions that it is in slightly wet condition when it is deposited on the work. This insures that the deposited material will remain in place rather than running into and filling indented portions 19 and 20 of the work and insures against premature drying of the deposited material which would cause it to form a chalky layer of discrete particles. When the deposited material is slightly wet, it builds up a layer which is generally at least as deep over projecting portions 18 of the work as over indented portions 19 and 20. The result is that the layer forms at its exposed or obverse surface, a pattern of projection portions 22 and recessed portions 24 and 25 which in general, reproduce the pattern or texturing of the underlying work. As is apparent from the drawings, there is some rounding of the edges defining the projecting portions and indented portions of the pattern in plate 10 and this rounding provides a softened appearance and softened feel to the sense of touch which simulates a grained leather surface.

Figure 4:
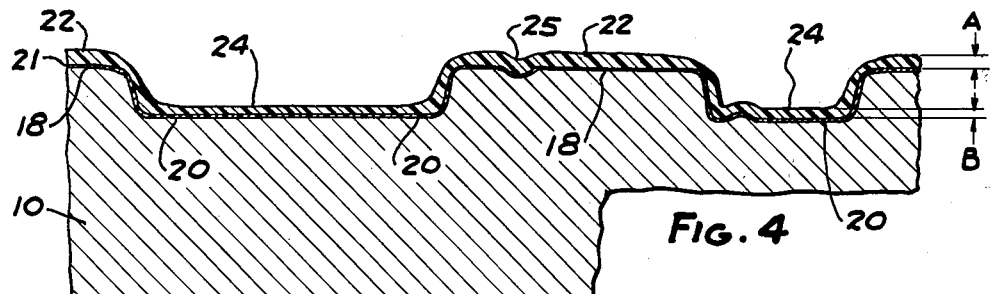
FIG. 4 is similar to FIG. 3 but illustrating the coating material applied over the primer coat.

It has been found in practice that the coating material builds up to a somewhat greater thickness over projecting portions 18 than over indented portions of the work so that the depth of the texturing is actually amplified as illustrated in FIG. 4 wherein the thickness A of coating portion 22 is greater than thickness B of coating portion 24. This not only improves the leather-like quality of the coating from the standpoint of appearance and sense of touch, but provides a greater thickness of plastic at the regions which are subject to the greatest wear. It has been noted that this amplifying phenomenon varies somewhat with the texture pattern of the underlying work. This phenomenon is not clearly understood. It tends to be more pronounced where the depth of the texturing is greater and less pronounced in shallow texturing. Moreover, the amplifying phenomenon tends to be more pronounced where the coating material is applied by electrostatic spray equipment than where it is applied by purely mechanical equipment.

In the example illustrated in the drawings, the depth of the embossing in the bare metal plate is about 4 mils. The primer 21 is applied to a depth of from about ¼ mil to about ½ mil. The plastic coat is applied over the primed metal plate to a thickness generally of about 6 mils. The depth of the texturing in the obverse face of the plastic material, that is, the depth between projecting portions 22 and recessed or indented portions 24 and 25 thereof, is about 20% greater than the depth of the embossing in the underlying metal plate. In other words, the depth of texture in the exposed plastic surface is about 4.8 mils.

While a flat sheet of material has been illustrated in the drawings for the sake of convenience, an important feature of the present invention is that the bare embossed metal sheet can be first fashioned to the ultimate shape of the article to be produced and the shaped article then primed and coated in the manner described. This eliminates the necessity of working or fashioning the article after the plastic coating has been applied and thus eliminates the numerous disadvantages referred to above which are inherent in prior methods of manufacture.

For similar reasons, the finished product is superior. Moreover, finished shaped articles can be manufactured by the present method at a cost less than the cost of flat, plastic laminated sheet metal stock produced by prior methods in the art. For example, whereas flat, plastic laminated sheet metal stock is sold by the manufacturer for about 31¢ per square foot, finished, shaped plastic coated articles can be produced by the present invention at a cost of about 24¢ to 27¢ per square foot of metal stock used. Moreover, any metal scrap resulting from manufacture according to the present method can be sold or reclaimed whereas the plastic coated metal scrap formed by prior methods is worthless.

It will be appreciated that the underlying form-retaining textured material need not be metal but may comprise a generally form-retaining shaped body of paper board or the like and where such a material is used, it need only be conditioned or treated for receiving a suitable primer to which the plastic coating will bond and the plastic coating may be applied in the manner described.

We claim:

1. An article having a textured surface of leather-like character comprising, a generally form retaining member having a textured surface with relatively indented portions and projecting portions, a single layer of material formed of a composition containing synthetic resinous material in dissolved form in a plasticizer so that said layer has resiliently distortable properties, said layer being at least about three mils thick, said layer having a reverse face adhered to said textured surface with the material forming said reverse face conforming to said indented and projecting portions, the thickness of the portions of said layer overlying said projecting portions being generally at least as great as the thickness of the layer portions overlying said indented portions so that the obverse face of said layer contains texturing generally reproducing that of said member and the depth of texture in said obverse face is generally at least as great as the depth of texture in said surface of said member.

2. The article defined in claim 1 wherein the thickness of said layer portions overlying said projecting portions is greater than the thickness of the layer portions overlying said indented portions whereby the depth of the texture reproduced in said obverse face is amplified over the depth of texture in said surface of said member.

3. The article defined in claim 1 wherein said layer has a thickness in the range from about at least 3 mils to about 20 mils.

4. The article defined in claim 1 wherein the depth of the texturing of said surface of said member between said relatively indented portions and projecting portions is of the order of about 4 mils.

5. The article defined in claim 1 wherein said form retaining member is formed of metal.

6. The article defined in claim 1 wherein said textured surface of said form-retaining member is metallic.

7. The method of making an article having a textured surface of leather-like character comprising, providing a generally form-retaining body having a textured surface with relatively indented portions and projecting portions, directing onto said surface in spray form a film-forming composition containing synthetic resinous material partly in substantially undissolved dispersed form and partly in dissolved form, the dissolved resin being present in sufficient quantity to inhibit mud-cracking, controlling said spray and the physical properties of said composition so that it is in slightly wet generally form-retaining condition at the time when it becomes deposited on said surface so that it conforms to the underlying textured surface and generally reproduces the same at its exposed surface, continuing to apply said spray until said film-forming composition is built up in a single layer of slightly wet but form-retaining material to a thickness of at least about 3 mils which reproduces at its exposed surface the texturing of said underlying surface, and then treating said layer to fuse the dispersed film-forming resinous material, whereby to preserve the texture of the exposed surface of the layer.

8. The method of making an article having a textured surface of leather-like character comprising, providing a generally form-retaining body having a textured surface with relatively indented portions and projecting portions, providing on said surface a thin coating of bonding material which will bond to said surface, directing onto the coated surface in spray form a composition which will bond to said coating and which contains synthetic resinous material partly in substantially undissolved dispersed form and partly in dissolved form, the dissolved resin being present in sufficient quantity to inhibit mud-cracking, controlling said spray and the physical properties of said composition so that it is in slightly wet generally form-retaining condition at the time when it becomes deposited on said surface, so that it conforms to the underlying textured surface and generally reproduces the same at its exposed surface, continuing to apply said spray until said film-forming composition is built up in a single layer of slightly wet but form-retaining material to a thickness of at least about 3 mils which reproduces at its exposed surface the texturing of said underlying surface, and then treating said layer to fuse the dispersed film-forming resinous material, whereby to preserve the texture of the exposed surface of the layer.

9. The method of making a coated metal article wherein the coating presents a textured surface of leather-like character which comprises, providing a metal body, forming in a surface of said metal body relatively indented portions and projecting portions to provide a textured surface, providing on said textured surface a thin coating of bonding material which will bond thereto, directing onto the coated surface in spray form a composition which will bond to said coating and which contains synthetic resinous material partly in substantially undissolved dispersed form and partly in dissolved form, the dissolved resin being present in sufficient quantity to inhibit mud-cracking, controlling said spray and the physical properties of said composition so that it is in slightly wet generally form-retaining condition at the time when it becomes deposited on said surface so that it conforms to the underlying textured surface and generally reproduces the texture thereof at its exposed surface, continuing to apply said spray until said film-forming composition is built up in a single layer of slightly wet but form-retaining material to a thickness of at least about 3 mils which reproduces at its exposed surface the texturing of said underlying surface, and then treating said layer to fuse the dispersed film-forming resinous material, whereby to preserve the texture of the exposed surface of the layer.

10. The method defined in claim 9 wherein the depth of said texture between said indented and projecting portions is of the order of about 4 mils.

11. The method of making an article having a textured surface of leather-like character comprising, providing a generally form-retaining body having a textured surface with relatively indented portions and projecting portions, providing on said surface a thin coating of bonding material which will bond to said surface and which will bond to a vinyl resin, directing onto the coated surface in spray form a film-forming composition containing a synthetic vinyl resin in substantially undissolved dispersed form, a plasticiser and a synthetic resinous material in dissolved form, the dissolved resinous material being present in sufficient quantity to inhibit mud-cracking of said vinyl resin, controlling said spray and the physical properties of said composition so that it is in slightly wet generally form-retaining condition at the time when it becomes deposited on said surface so that it conforms to the underlying textured surface and generally reproduces the same at its exposed surface, continuing to apply said spray until said film-forming composition is built up in a single layer of slightly wet but form-retaining material to a thickness of at least about 3 mils which reproduces at its exposed surface the texturing of said underlying surface, and then subjecting said layer to heat to fuse said vinyl resin and plasticiser, whereby to preserve the texture of the exposed surface of said layer.

References Cited in the file of this patent

UNITED STATES PATENTS

| | | |
|---|---|---|
| 300,763 | Chapman | June 24, 1884 |
| 1,499,985 | Kirsch | July 1, 1924 |
| 2,032,405 | Fischer et al. | Mar. 3, 1936 |
| 2,046,954 | La Verne et al. | July 7, 1936 |
| 2,345,942 | Lehman | Apr. 4, 1944 |
| 2,385,920 | Jenkins | Oct. 2, 1945 |
| 2,851,000 | Kaplan et al. | Sept. 9, 1958 |

UNITED STATES PATENT OFFICE
CERTIFICATE OF CORRECTION

Patent No. 3,023,124                                            February 27, 1962

Wilfred G. Cryderman et al.

It is hereby certified that error appears in the above numbered patent requiring correction and that the said Letters Patent should read as corrected below.

Column 3, after line 60, insert the following paragraph:

After the layer of coating material has been deposited on the work, it is subjected to heat to fuse the vinyl resin and plasticiser, whereby to preserve the texture of the exposed surface of the layer.

Signed and sealed this 21st day of July 1964.

(SEAL)

Attest:

ESTON G. JOHNSON                                              EDWARD J. BRENNER
Attesting Officer                                                   Commissioner of Patents

Dedication 3,023,124.—*Wilfred G. Cryderman* and *Arthur R. Marshall*, Birmingham, Mich. METHOD OF MAKING TEXTURED LEATHER-LIKE ARTICLE AND PRODUCT THEREOF. Patent dated Feb. 27, 1962. Dedication filed Sept. 9, 1968, by the assignee, *The Bishop and Babcock Corporation*.

Hereby dedicates to the Public all claims of said patent.

[*Official Gazette October 15, 1968.*]